Patented Aug. 30, 1949

2,480,672

UNITED STATES PATENT OFFICE 2,480,672

PROCESS FOR FORMING POROUS GLASS AND COMPOSITION THEREOF

Charles J. Plank, Woodbury, N. J., assignor to Socony-Vacuum Oil Company, Incorporated, a corporation of New York No Drawing. Application August 12, 1944, Serial No. 549,295

4 Claims. (Cl. 49—79)

This invention relates to a process for preparing porous glass suitable for use as catalysts, catalyst supports and for the formation of impervious glass of high silica content. The present invention is related to the known processes of forming porous glass from boro-silicate glasses, such as the processes disclosed in U. S. Patents 2,106,744, 2,215,039 and 2,286,275. These previously-known processes involve formation of alkali metal oxide boro-silicate glasses. The glass is then heat treated to induce separation of the glass into two phases, one relatively rich in silica and the other consisting primarily of alkali metal oxide and boric oxide. Upon leaching the heat-treated glass with dilute mineral acids, the phase poor in silica is dissolved out, leaving a porous skeleton consisting substantially of pure silicon dioxide. This skeleton may be impregnated with various materials to give decorative effects or with catalytic substances to yield a catalyst of great surface area. The porous glass may be heated to cause closing of the pores, thus yielding a high silica glass having many of the properties of fused quartz.

I have now found that porous glass may be prepared by a very much simplified process requiring very little heat treatment and capable of being leached with pure water or other aqueous medium. This result is achieved by incorporating substantial amounts of aluminum oxide and phosphorus pentoxide in the melt from which the glass is prepared. It has been noted in the prior art that substantial amounts, up to a maximum of about 4 per cent, of aluminum oxide may be tolerated in boro-silicate glasses from which porous glass is to be prepared. No advantage in such incorporation of aluminum oxide has been noted by the prior art.

According to the present invention the melt is prepared with from 5 to 15 per cent of aluminum oxide and about 7 to 24 per cent, preferably a substantially equal molecular proportion of phosphorus pentoxide. The permissible variation in the amounts of phosphorus pentoxide is fairly large since the process can tolerate an excess of 1 or 2 per cent of either aluminum oxide or phosphoric pentoxide, however, the ratio of these two oxides should be such that the glass will theoretically contain a substantial proportion, say, at least 3 per cent, of aluminum phosphate ($AlPO_4$).

This incorporation of oxides of aluminum and phosphorus in the melt permits very great reductions in silica content. For example, porous glass may be prepared from a boro-silicate glass containing as little as 25% silica when utilizing the principles of this invention. Alkali metal oxides and boric oxide are present in the melt in amounts suitable to form a glass in view of the relative amounts of silica, aluminum oxide and phosphorus pentoxide. In general, the limits within which the present glasses may be prepared are as follows:

| | Percent |
|---|---|
| $SiO_2$ | 25 to 70 |
| $Al_2O_3$ | 5 to 15 |
| Alkali metal oxide | 3 to 10 |
| $B_2O_3$ | 15 to 45 |
| and | |
| $P_2O_5$ | 7 to 24 |

The melt will preferably contain an amount of phosphorus pentoxide substantially equivalent to the alumina on a molar basis. Since $AlPO_4$ is similar in structure in the glassy state to vitreous $SiO_2$, it is very likely that the $Al_2O_3$ and $P_2O_5$ are present in the melt, for the most part, in this form. The other constituents of the base glass are an alkali oxide and $B_2O_3$.

Glasses of this type are attacked by water. However, the effect of the water is merely to extract a soluble phase and leave a porous glass structure which is chemically and physically stable. Thus, unlike previous glasses used as sources of porous glass, no acid leaching is required. This operation of leaching with $H_2O$ is a very rapid one at 90° to 100° C., requiring less than eight hours, if the glass is about 2 to 3 mm. thick. This fact alone presents a decided improvement over the amount of time necessary to leach the alkali boro-silicate glasses.

Depending on the speed with which these melts containing $Al_2O_3$ and $P_2O_5$ are cooled to room temperatures, the glasses are clear and colorless to opalescent. In fact, in cases of too slow cooling, they may be partially devitrified and opaque. In any case, with no heat treatment other than that necessary to anneal the glass, it may be leached with $H_2O$ to form a truly porous glass. The leaching in some cases causes cracking to small particles, the individual particles being completely porous. In some cases where the porous glass is to be used as a catalyst or catalyst support (e. g. in cracking petroleum to gasoline) such cracking would be no disadvantage whatsoever, as such particles may be desired for catalytic purposes. When it is desirable to avoid cracking, as in the case of glass articles which are to be revitrified at temperatures of 800° to 1000° C. to form non-porous glass articles, or catalysts in the form of beads, pellets, tubes or rods, proper heat treatment previous to leaching will overcome the tendency to crack.

The resultant porous glass contains essentially $Al_2O_3$ and $SiO_2$ with minor amounts of the other oxides. The soluble phase contains most of the $R_2O$, $P_2O_5$ and $B_2O_3$, and but small amounts of $Al_2O_3$, and $SiO_2$.

*Example I*

A mixture of 84 grams $SiO_2$, 80 grams $B_2O_3$, 20 grams $AlPO_4$ and 16 grams $Na_2O$ was melted at 2300° F. After 30 minutes the temperature was raised to 2500° F. The melt was then quite fluid and was quenched in $H_2O$. A clear glass was obtained. This glass was readily attacked by boiling $H_2O$, being converted to a porous glass containing submicroscopic pores.

*Example II*

A mixture of 50 grams $SiO_2$, 64 grams $B_2O_3$, 70 grams $AlPO_4$ and 16 grams $Na_2O$ was melted at 2150° F. After 30 minutes the temperature of the furnace was 2200° F. The temperature was then raised to 2500° F. in 20 minutes. The melt was quenched in $H_2O$ and an opalescent glass was produced. As in Example I, this glass was rapidly leached by boiling $H_2O$ to a porous glass containing submicroscopic pores.

I claim:

1. The process for forming a porous glass which comprises preparing a boro-silicate glass containing aluminum oxide and phosphorus pentoxide, said glass having a composition within the following limits: $SiO_2$, 25 to 70 per cent; $Al_2O_3$, 5 to 15 per cent; $Na_2O$, 3 to 10 per cent; $B_2O_3$, 15 to 45 per cent; and $P_2O_5$, 7 to 24 per cent, heat treating said glass at an elevated temperature for a period of time sufficient to effect separation thereof into phases relatively rich and relatively poor in silica and thereafter leaching said glass with water.

2. The process for forming a porous glass which comprises preparing a boro-silicate glass containing aluminum oxide and a substantially molecular equivalent of phosphorus pentoxide, said glass having a composition within the following limits: $SiO_2$, 25 to 70 per cent; $Al_2O_3$, 5 to 15 per cent; $Na_2O$, 3 to 10 per cent; $B_2O_3$, 15 to 45 per cent; and $P_2O_5$, 7 to 24 per cent, heat treating said glass at an elevated temperature for a period of time sufficient to effect separation thereof into phases relatively rich and relatively poor in silica and thereafter leaching said glass with water.

3. The process for forming a porous glass which comprises preparing a boro-silicate glass containing aluminum oxide and phosphorus pentoxide, said glass having a composition within the following limits: $SiO_2$, 25 to 70 per cent; $Al_2O_3$, 5 to 15 per cent; $Na_2O$, 3 to 10 per cent; $B_2O_3$, 15 to 45 per cent; and $P_2O_5$, 7 to 24 per cent, heat treating said glass at an elevated temperature for a period of time sufficient to effect separation thereof into phases relatively rich and relatively poor in silica and thereafter leaching said glass with hot water.

4. A glass, suitable for conversion into a porous mass, having the following composition: $SiO_2$, 25 to 70 per cent; $Al_2O_3$, 5 to 15 per cent; $Na_2O$, 3 to 10 per cent; $B_2O_3$, 15 to 45 per cent; and $P_2O_5$, 7 to 24 per cent.

CHARLES J. PLANK.

REFERENCES CITED

The following references are of record in the file of this patent:

UNITED STATES PATENTS

| Number | Name | Date |
| --- | --- | --- |
| 2,010,836 | Adams | Aug. 13, 1935 |
| 2,100,391 | Grimm | Nov. 30, 1937 |
| 2,303,756 | Nordberg et al. | Dec. 1, 1942 |
| 2,394,502 | Weyl et al. | Feb. 5, 1946 |

FOREIGN PATENTS

| Number | Country | Date |
| --- | --- | --- |
| 428,329 | Great Britain | May 10, 1935 |